United States Patent
Lo et al.

(10) Patent No.: US 7,437,139 B2
(45) Date of Patent: Oct. 14, 2008

(54) METHOD AND APPARATUS FOR CALIBRATING FILTERING OF A TRANSCEIVER

(75) Inventors: Steve Lo, Sunnyvale, CA (US); Isaac Sever, Sunnyvale, CA (US); Thai Nguyen, San Jose, CA (US); Ssu-Pin Ma, San Jose, CA (US)

(73) Assignee: Tzero Technologies, Inc., Sunnyvale, CA (US)

( * ) Notice: Subject to any disclaimer, the term of this patent is extended or adjusted under 35 U.S.C. 154(b) by 510 days.

(21) Appl. No.: 11/258,701

(22) Filed: Oct. 26, 2005

(65) Prior Publication Data

US 2007/0093224 A1  Apr. 26, 2007

(51) Int. Cl.
*H04B 1/16* (2006.01)
(52) U.S. Cl. .............. 455/340; 455/339; 455/125; 455/307; 455/266
(58) Field of Classification Search ............ 455/340, 455/339, 125, 307, 266; 333/17.1
See application file for complete search history.

(56) References Cited

U.S. PATENT DOCUMENTS

| | | | |
|---|---|---|---|
| 5,528,633 A | * | 6/1996 | Halik et al. ............ 375/326 |
| 6,553,216 B1 | | 4/2003 | Pugel et al. |
| 6,684,065 B2 | | 1/2004 | Bult et al. |
| 6,865,381 B2 | | 3/2005 | Vorenkamp et al. |
| 6,915,114 B2 | | 7/2005 | Khorran |
| 7,039,385 B1 | * | 5/2006 | Hoffmann et al. ......... 455/340 |
| 2005/0215204 A1 | | 9/2005 | Wallace et al. |

OTHER PUBLICATIONS

Mehta, Jesal, Transceiver Architectures for Wireless ICs, Feb. 2001, RFdesign.

* cited by examiner

*Primary Examiner*—Sanh D Phu
(74) *Attorney, Agent, or Firm*—Brian R. Short (57) ABSTRACT

A method and apparatus of calibrating filtering of receive and transmit signals is disclosed. The method of calibrating filtering of a received signal includes injecting an LO signal. The injected LO signal is filtered by a tunable filter. The filtered signal is frequency down-converted with an equivalent LO signal. The frequency down-converted signal is sampled while tuning the filtering. A desired filter tuning is determined based upon the samples and a frequency of the LO signal. The method of calibrating filtering of a transmit signal includes injecting an LO signal to a transmitter. The LO signal is filtered by a tunable filter. The filtered signal is frequency down-converted with an equivalent LO signal. The frequency down-converted signal is sampled while tuning the filter. A desired filter tuning is determined based upon the samples and a frequency of the LO signal.

27 Claims, 8 Drawing Sheets

METHOD AND APPARATUS FOR CALIBRATING FILTERING OF A TRANSCEIVER

FIELD OF THE INVENTION

The invention relates generally to communication systems. More particularly, the invention relates to a method and apparatus for providing transmission signal filtering selectivity within a wideband transceiver.

BACKGROUND OF THE INVENTION

Figure 1:
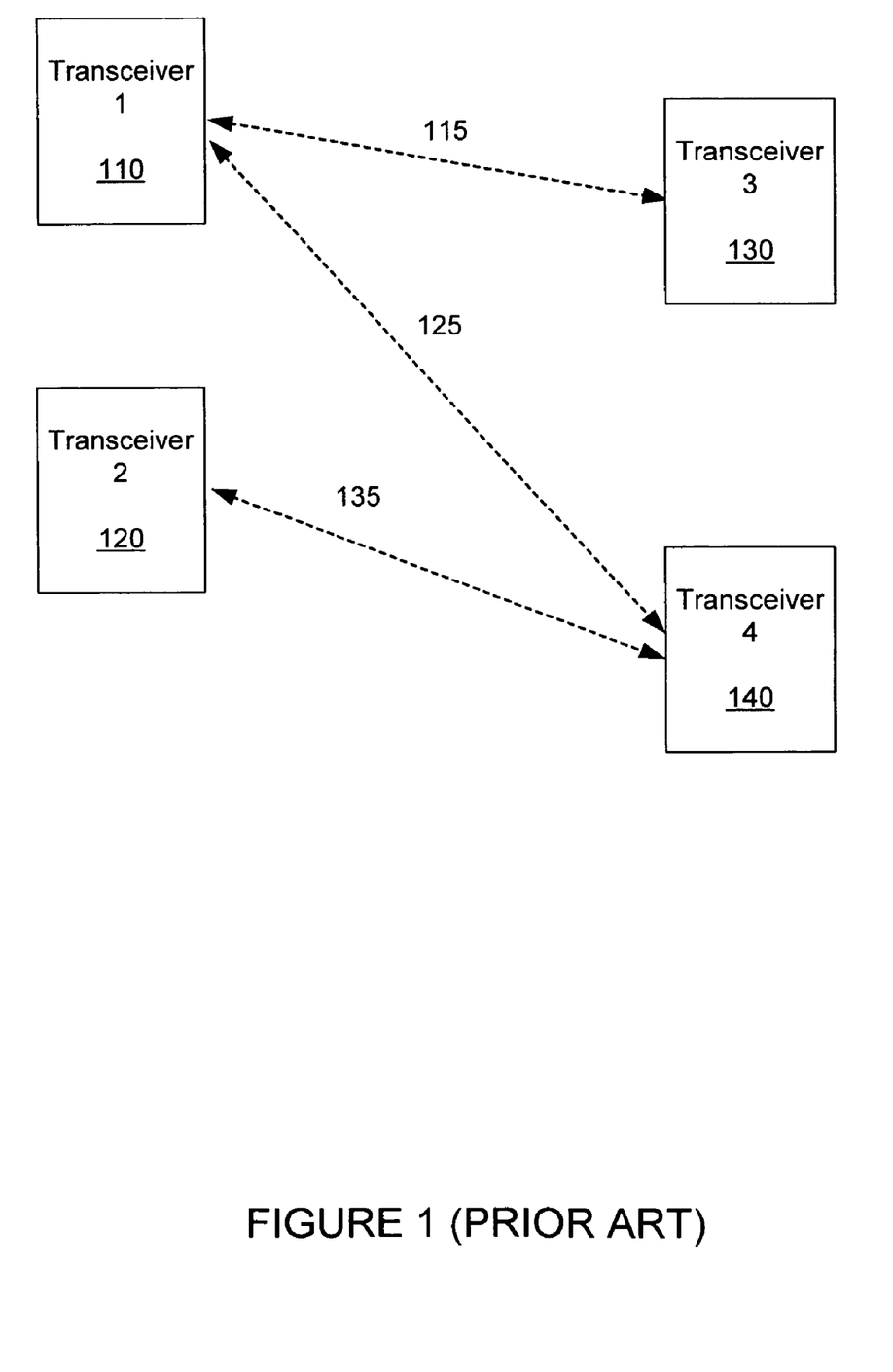
FIG. 1 shows a prior art UWB mesh network.

Ultra-wideband (UWB) modulation provides high data rate radio communications for transferring data using very wide modulation bandwidths. FIG. 1 shows a typical application of UWB communication links used for indoor wireless communications. Several transceivers, for example, transceivers 110, 120, 130, 140 are networked allowing high bandwidth communications between the transceivers 110, 120, 130, 140. The transceivers 110, 120, 130, 140 can include, for example, a high definition television (HDTV) monitor networked with other devices, such as, a digital video recorder (DVR), a digital video disk (DVD) player and a computing device.

The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction. The bandwidth of each transmission channel is 528 MHz.

The wideband, low transmission power requirements of UWB transmission make it particularly susceptible to interference. Like-type devices (other UWB devices) can cause interfering signals, as well as other types of wireless devices. One type of interference is out-of-band interference. Out-of-band interference is due to interfering signals having frequencies outside of a transmission channel of interest. Out-of-band emission can be reduced by bandpass filtering the transmitted signals, and the effects of the out-of-band interference can be mitigated by bandpass filtering the received signal.

It is desirable have a method and apparatus for reducing the effects of interference in UWB devices.

SUMMARY OF THE INVENTION

An embodiment of the invention includes a method of calibrating filtering of a received signal. The method includes injecting an LO signal. The injected LO signal is filtered by a tunable filter. The filtered signal is frequency down-converted with an equivalent LO signal. The frequency down-converted signal is sampled while tuning the filtering. A desired filter tuning is determined based upon the samples and a frequency of the LO signal.

Another embodiment of the invention includes a method of calibrating filtering of a transmit signal. The method includes injecting an LO signal to a transmitter. The LO signal is filtered by a first tunable filter. The filtered signal is frequency down-converted with an equivalent LO signal. The frequency down-converted signal is sampled while tuning the filter. A desired first filter tuning is determined based upon the samples and a frequency of the LO signal.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for calibrating filtering of transmit and receive signals of a transceiver. The calibrated filtering provides for improved rejection of interfering signals of a wideband transceiver.

Figure 2:
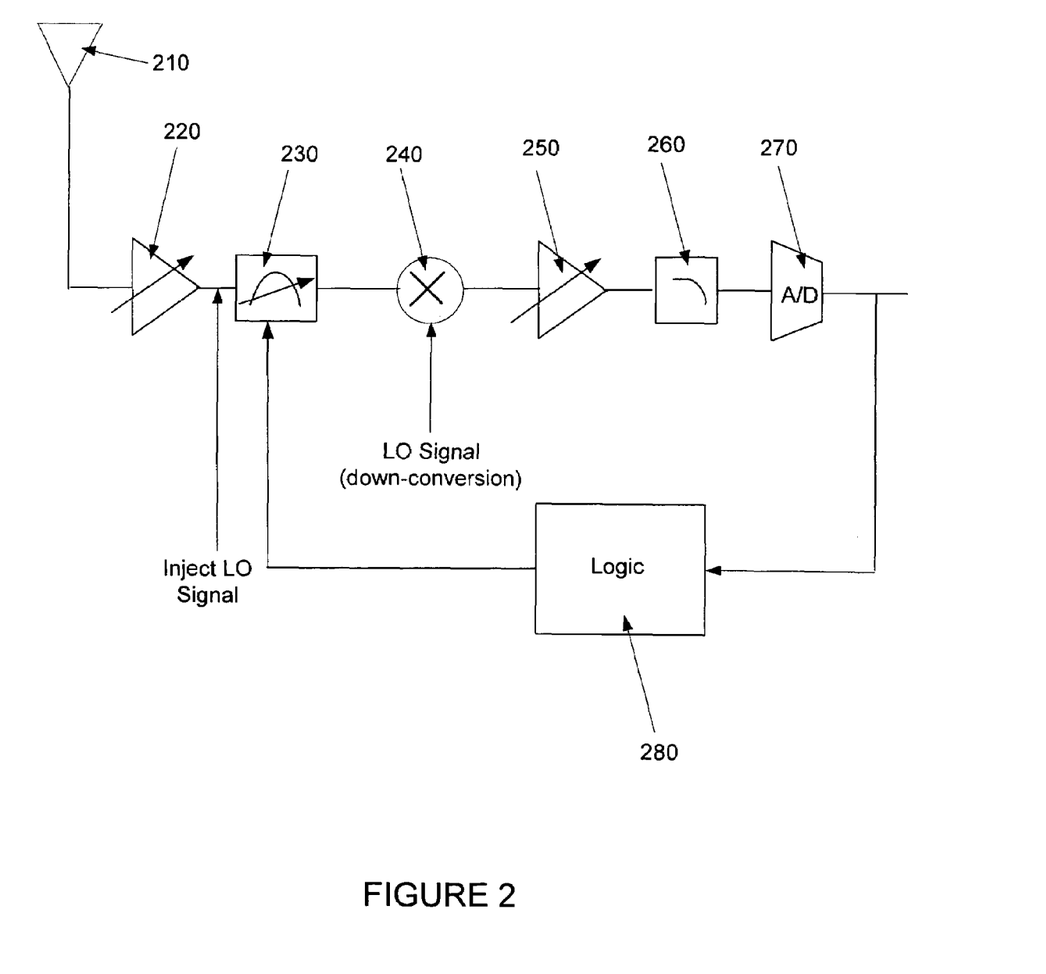
FIG. 2 shows a receiver that includes a tunable selective bandpass filter.

FIG. 2 shows a receiver that includes a tunable selective bandpass filter 230. The bandpass filter 230 generally filters out-of-band interfering signals from received transmission signals.

The transmission signals are received through, for example, antenna 210. The received transmission signals are amplified by a low noise amplifier (LNA) 220. The tunable bandpass filter 230 passes in-band signals while attenuating out-of-band signals.

The filtered received signals are frequency down-converted by a mixer 240. The mixer 240 frequency down-converts the received signals to a base-band frequency by mixing them with a local oscillator (LO) signal. The base-band frequency signals are additionally amplified and filtered by another variable gain amplifier (VGA) 250 and a filter 260 (typically lowpass).

The filtered base-band signals are sampled by an analog to digital converter (ADC) 270. The samples provide a digital representation of the received signals.

Calibration of the Tunable Filter

For optimal performance, it is desirable to calibrate tuning of the bandpass filter 230. Typically, optimal performance results when the pass-band of the bandpass filter 230 is centered, and the attenuation of out-of-band signals by the bandpass filter is maximized. The embodiment of FIG. 2 includes a tunable bandpass filter. However, the calibration methods described here can be applied to other types of filters, such as, lowpass filters, highpass filters or band-stop (notch) filters.

An exemplary method of calibrating filtering of a received signal includes injecting an LO signal, filtering the injected LO signal with a tunable filter, frequency down-converting the filtered signal with an equivalent LO signal, sampling the frequency down-converted signal while tuning the filtering, and determining a desired filter tuning based upon the samples and a frequency of the LO signal.

The logic circuitry 280 can tune the tunable filter 230, and measure the results of the tuning by monitoring the values of the digital samples generated by the ADC 270. As shown in FIG. 2, an LO signal can be injected before the tunable filter 230. The logic circuitry 280 can process digital samples of the frequency down-converter and filtered injected LO signal to determine the tuning response of the tunable filter 230. That is, the logic circuitry can set the frequency of the injected LO signal, and then tune the frequency response of the tunable filter 230. Depending upon the desired filter characteristic (in-band gain, out-of-band rejection or filter response flatness) the logic circuitry 280 can determine and store the preferred tuning of the tunable filter 230. When receiving transmissions signals, the logic circuitry 280 can retrieve the preferred tuning of the tunable filter 230.

The receiver typically receives signals over several different transmission channels. Therefore, the tunable filter 230 should be characterized at each of the multiple transmission frequencies. This calibration can include adjusting the injected LO signal and the equivalent LO signal to multiple frequencies, and determining a desired filter tuning based upon the samples for each of the multiple frequencies. The multiple frequencies of the LO signals can be selected to correspond to a center frequency of each one of multiple transmission channels. Alternatively, the multiple frequencies of the LO signals can be selected to correspond to off-center of each of the multiple transmission channels.

Optimal Calibration

What is considered the optimal calibration can vary. For example, optimal filter performance can be maximum in-band gain, maximum filter response flatness, maximum out-of-band rejection or a weighted selection of all these filter parameters.

A first exemplary embodiment for determining a desired filter tuning based upon the samples, includes tuning the filtering over channels corresponding to each of the multiple transmit frequencies. From samples, the desired tuning is selected by determining the desired filter tuning to maximize in-band gain through the channels of each of the multiple frequencies.

A second exemplary embodiment for determining a desired filter tuning based upon the samples, includes tuning the filtering over channels corresponding to each of the multiple transmit frequencies. From the samples, the desired tuning is selected by determining the desired filter tuning to maximize frequency response flatness through the channels of each of the multiple frequencies.

A third exemplary embodiment for determining a desired filter tuning based upon the samples, includes tuning the filtering over channels corresponding to each of the multiple transmit frequencies. From the samples, the desired tuning is selected by determining the desired filter tuning to maximize out-of-band rejection of the channels of each of the multiple frequencies.

A fourth exemplary embodiment for determining a desired filter tuning based upon the samples, includes tuning the filtering over channels corresponding to each of the multiple transmit frequencies. From the samples, the desired tuning is selected by determining the desired filter tuning to maximize a weighting of in-band gain through the channels of each of the multiple frequencies, frequency response flatness through the channels of each of the multiple frequencies, out-of-band rejection of the channels of each of the multiple frequencies. The weighting between each of the filtering characteristics can be varied depending upon the perceived importance of each of the filtering characteristics.

For one embodiment, the calibration includes determining a desired filter tuning based upon the samples by executing a binary search that converges on the desired combination of filter characteristics. That is, the logic circuitry 280 tunes the tunable filter according to a binary search converging on the desired filter tuning by monitoring the values of the digital samples of the ADC 270. Another embodiment includes sweeping the tuning of the tunable filter 230 over the full frequency range of a transmission channel, and characterizing the resulting response.

Figure 3:
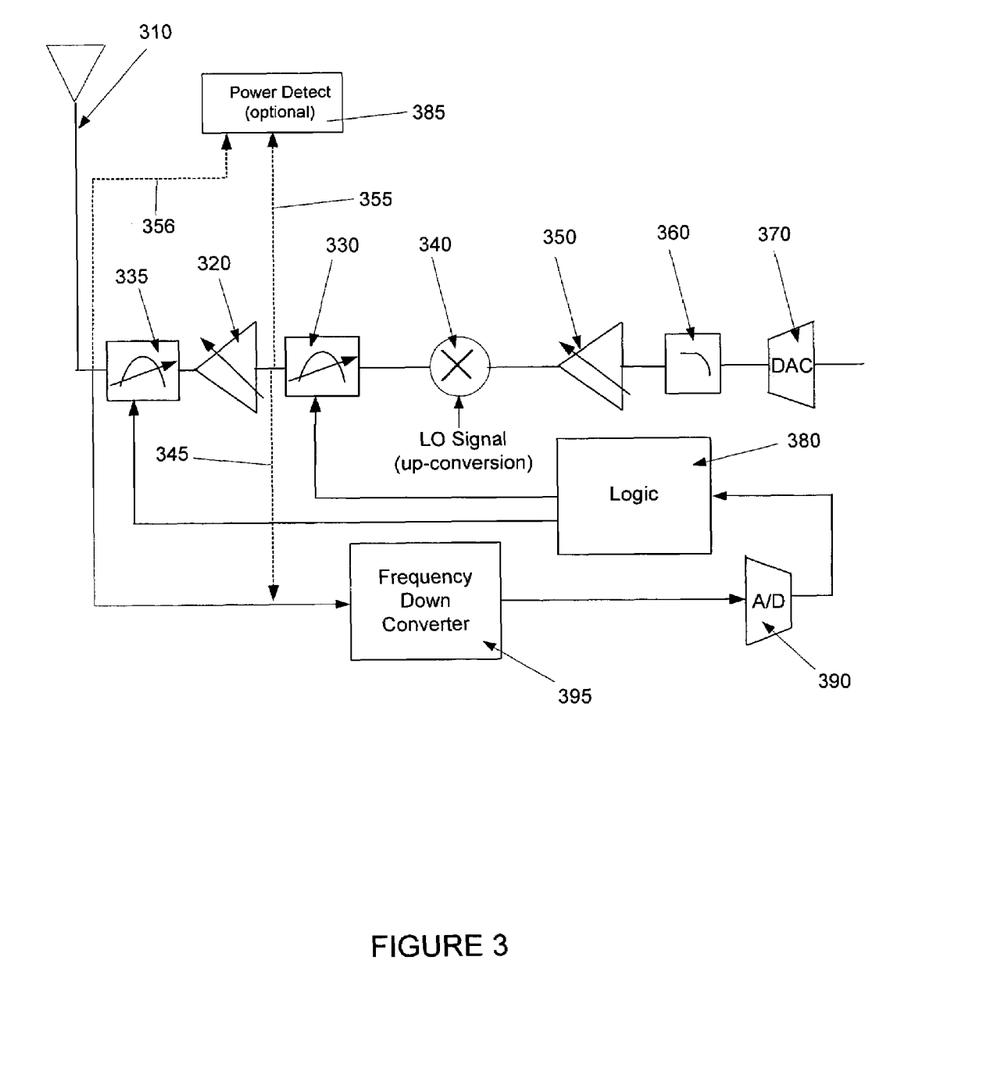
FIG. 3 shows a transmitter that includes tunable selective bandpass filters.

FIG. 3 shows a transmitter that includes a tunable selective bandpass filtering. The transmitter chain includes two tunable filters 330, 335. It is to be understood that the transmitter can include any number of tunable filters. The two tunable filters shown in FIG. 3 are for illustration of a transmitter that includes calibrating more than one tunable filter. A simpler embodiment includes a single tunable filter.

The transmitter chain operates by a digital to analog converter (DAC) 370 receiving digital samples for transmission. The DAC converts the digital samples to an analog signal. The analog signal is filtered (filter 360) and amplified (VGA 350) before being frequency up-converted by a mixer 340. The analog signal is frequency up-converted by an LO signal. The frequency up-converted signal is filtered (by the tunable filters 330, 335) and amplified (VGA 320) before transmission through an antenna 310.

For optimal performance, it is desirable to calibrate tuning of the bandpass filters 330, 335. Typically, optimal performance results when the pass-band of the bandpass filters 330, 335 are centered, and the attenuation of out-of-band signals by the bandpass filters is maximized. The embodiment of FIG. 3 includes tunable bandpass filters. However, the calibration methods described here can be applied to other types of filters, such as, lowpass filters, highpass filters or band-stop (notch) filters.

For a single filter (such as tunable filter 330), an exemplary method of calibration includes injecting an LO signal to a transmitter output, filtering the LO signal with a first tunable filter 330, frequency down-converting the filtered signal with an equivalent LO signal, sampling the frequency down-converted signal while tuning the filter, and determining a desired first filter tuning based upon the samples and a frequency of the LO signal. As shown in FIG. 3, the LO signal is injected by driving the mixer 340 with a zero frequency (D.C.) input and the LO signal. The resulting output signal of the mixer 340 has a frequency as set by the LO signal.

The output signal of the mixer 340 is filtered by the tunable filter 330. The filtered output is then frequency down-converted (frequency down converter 395) and sampled, allowing logic circuitry to calibrate the tunable filter 330. The output signal of the tunable filter 330 can be directly connected to the frequency down converter 395 (as shown by connection line 345), or the output signal can be coupled to the frequency down converter 395 through the VGA 320 and a second tunable filter 335 (optional).

Similar to the receiver tunable filter calibration, an exemplary embodiment for determining a desired filter tuning based upon the samples, includes tuning the filtering over channels corresponding to each of the multiple transmit frequencies. From the samples, the desired tuning is selected by determining the desired filter tuning to maximize a weighting of in-band gain through the channels of each of the multiple frequencies, frequency response flatness through the channels of each of the multiple frequencies, out-of-band rejection of the channels of each of the multiple frequencies. The weighting between each of the filtering characteristics can be varied depending upon the perceived importance of each of the filtering characteristics. Any one of the filtering characteristics can be individually used to determine the desired tuning.

For one embodiment, the calibration includes determining a desired filter tuning based upon the samples by executing a binary search that converges on the desired combination of filter characteristics. That is, the logic circuitry 380 tunes the tunable filter 330 according to a binary search converging on the desired filter tuning by monitoring the values of the digital samples of the ADC 390. Another embodiment includes sweeping the tuning of the tunable filter 330 over the full frequency range of a transmission channel, and characterizing the resulting response.

The frequency down converter 395 can be within a receiver portion of a transceiver as will be shown. That is, the frequency down conversion can be performed by a receiver chain.

As mentioned, the second tunable filter 335 can provide additional filtering of transmission signals. For this embodiment, the method of calibrating filtering of a transmit signal includes additionally filtering the LO signal with the second tunable filter, frequency down-converting the additionally filtered signal with an equivalent LO signal, sampling the frequency down-converted signal while tuning the second filter, and determining a desired second filter tuning based upon the samples and a frequency of the LO signal. As with the single tunable filter embodiment, the calibration can include adjusting the injected LO and the equivalent LO signal to multiple frequencies, and determining a desired second filter tuning based upon the samples for each of the multiple frequencies.

As shown, the second tunable filter 335 filters the LO signal after the first tunable filter 330 filters the LO signal. An embodiment of determining a desired first filter 330 and second filter 335 tuning based upon the samples include tuning the filtering over channels corresponding to each of the multiple frequencies, and from the samples, determining the desired first filter and second filter tuning to maximize a weighting of in-band gain through the channels of each of the multiple frequencies, of frequency response flatness through the channels of each of the multiple frequencies, of rejection of selected frequencies of the channels of each of the multiple frequencies. Determining the desired first filter and second filter tuning based upon the samples can include executing a binary search that converges on a maximum in-band gain of the combined first and second filtering. More generally, determining the desired first filter and second filter tuning based upon the samples can include executing a binary search that converges on a maximum weighting of gain through the channels of each of the multiple frequencies, of frequency response flatness through the channels of each of the multiple frequencies, of out-of-band rejection of the channels of each of the multiple frequencies.

FIG. 3 also includes an optional power detector 385. The power detector 385 can be optionally included in the two tunable filter embodiment (tunable filters 330, 335). One of the tunable filters 330, 335 can be characterized using the power detector 385 rather than frequency down converting the filtered LO signal. An output of one of the tunable filters is connected to the power detectors 385 (this connection is shown by the dash lines 355, 356). An output of the power detector 385 can be sampled and processed by the A/D 390 and logic circuitry 380.

The two tunable filters 330, 335 can be similarly tuned to provide maximum in-band gain and maximum out-of-band rejections. Alternatively, the tunable filters 330, 335 can be tuned differently to provide a flatter pass-band, or to selectively filter undesired signals.

Figure 4:
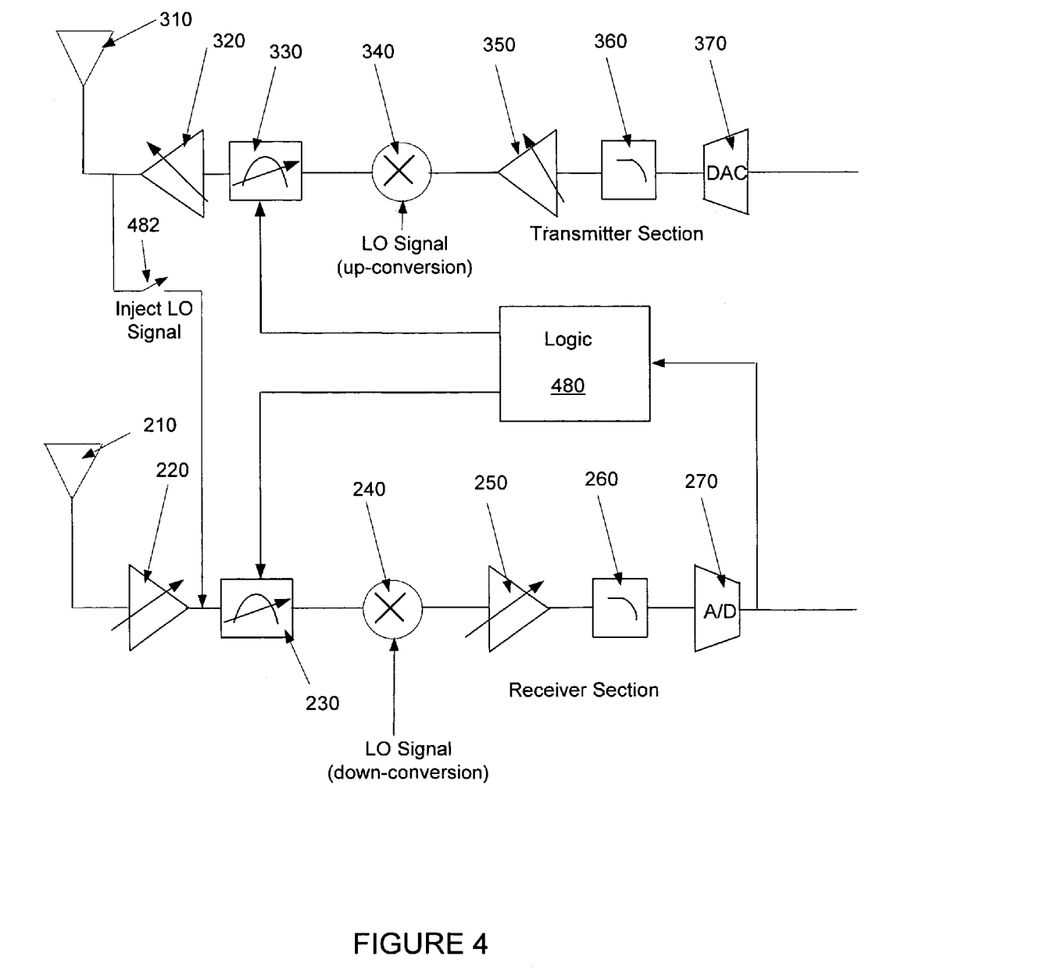
FIG. 4 shows a transceiver that includes selective bandpass filters.

FIG. 4 shows a transceiver that includes selective bandpass filters. The transceiver of FIG. 4 essentially includes a combination of the receiver of FIG. 2, and the transmitter of FIG. 3. Typically, the LO signals for the receiver section and the transmitter section are generated by the same local oscillator. The receiver chain can provide the frequency down conversion needed to characterize the transmitter filtering. The transmitter chain can provide the injected LO signal to the receiver chain. The combined logic block 480 provides the tuning control of the tunable filters, and characterizes the tuning based upon the frequency down converted samples at the output of the ADC 270. A switch 482 provides a loop back path for coupling transmitter section signal (such as injected LO signal) to the receiver section.

Figure 5A:
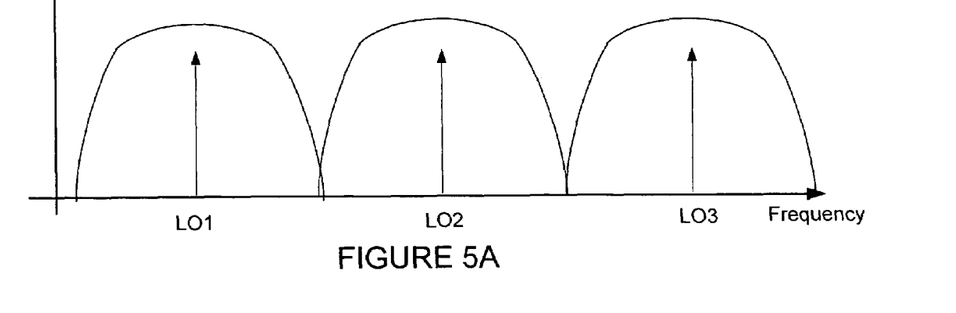
FIG. 5A shows a frequency spectrum of several different LO frequencies in which a bandpass filter is tuned.

FIG. 5A shows a frequency spectrum of several different LO frequencies in which a bandpass filter is tuned. As previously described, a single transceiver can support transmission over several different channels, in which each channel has a different center frequency. FIG. 5A shows three potential transmission channels, and LO frequencies LO1, LO2, LO3 centered within each of the transmission channels. An exemplary embodiment includes the tunable filters of a transceiver being calibrated to maximize the in-band gain. The calibration can be performed at several frequencies by setting the injected LO frequency to a center point of each of the transmission channels, and tuning the tunable filter. Desired tuning is stored for each of the transmission channels. During transmission or reception, the desired tuning corresponding to the transmission channels is retrieved from storage.

Figure 5B:
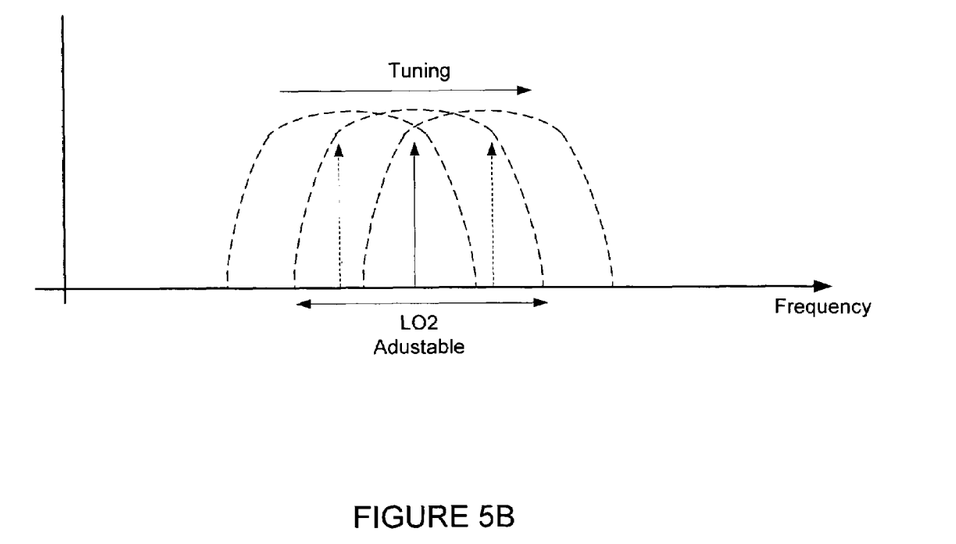
FIG. 5B shows a frequency spectrum a bandpass filter being tuned around an LO frequency.

FIG. 5B shows a frequency spectrum a bandpass filter being tuned around an LO frequency. The arrow marked "Tuning" shows how the tunable filter can be adjusted within respect to an LO frequency, such as LO2. FIG. 5B also shows that the LO frequency can be tuned off of the center of a transmission channel.

Figure 6:
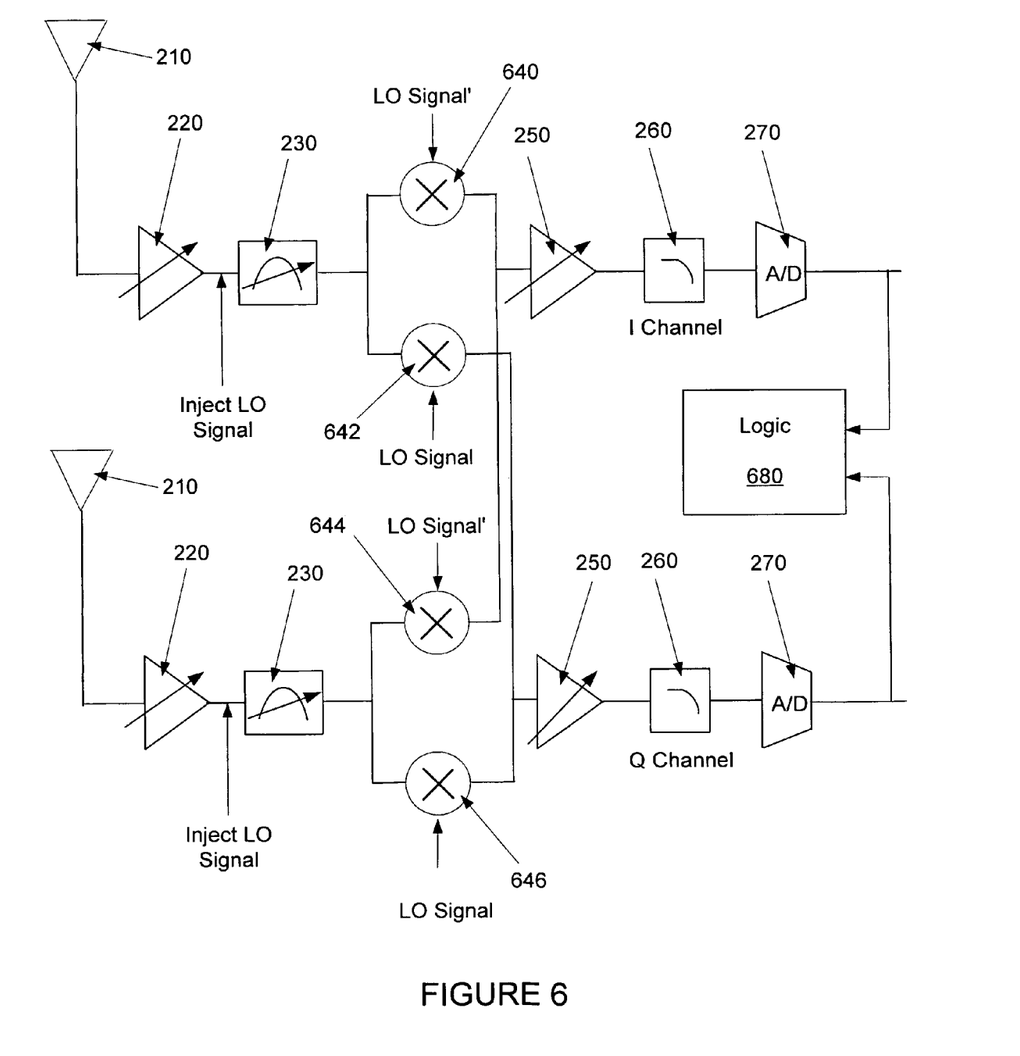
FIG. 6 shows a multiple antenna receiver that includes selective bandpass filters, and I-Q down-converter chains.

FIG. 6 shows a multiple antenna receiver that includes selective bandpass filters, and I-Q down-converter chains. The I-Q chains can be used to improve the robustness of the received signal. The LO signals of the Q channel include a phase that is approximately 90 degrees out of phase from the LO signals (LO signal') of the I channel.

An equivalent multiple antenna transmitter chain that includes selective filtering and I-Q up converters can be configured as well. As with the previously described transceiver, a feedback loop can be used to allow the transmitter chain to provide the injected LO signal needed to characterize the receiver chain tunable filtering. The feedback loop can also be used to allow the receiver chain to provide the frequency down conversion need to characterize the transmitter chain tunable filtering.

A first receiver chain include an I channel mixer 642 and a Q channel mixer 644. A second receiver chain includes an I channel mixer 644 and a Q channel mixer 646. Logic circuitry 680 receives digital samples of each channel (I and Q) allowing the logic circuitry to characterize the tunable filters 230. The tuning control lines from the logic circuitry 680 are not shown in FIG. 6.

Figure 7:
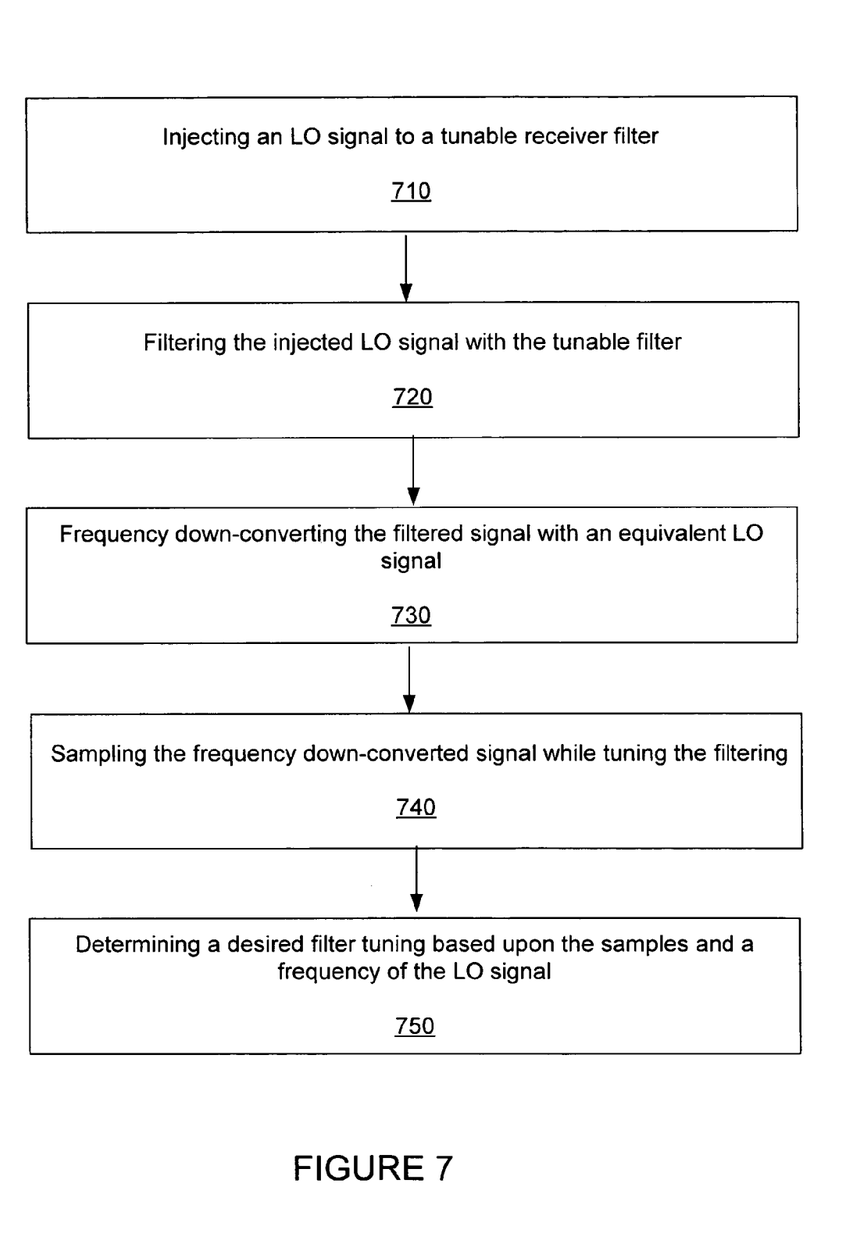
FIG. 7 is a flow chart depicting a method of calibrating filtering of a received signal.

FIG. 7 is a flow chart depicting a method of calibrating filtering of a received signal. A first step 710 includes injecting an LO signal to a tunable receiver filter. A second step 720 includes filtering the injected LO signal with the tunable filter. A third step 730 includes frequency down-converting the filtered signal with an equivalent LO signal. A fourth step 740 includes sampling the frequency down-converted signal while tuning the filtering. A fifth step includes determining a desired filter tuning based upon the samples and a frequency of the LO signal.

Figure 8:
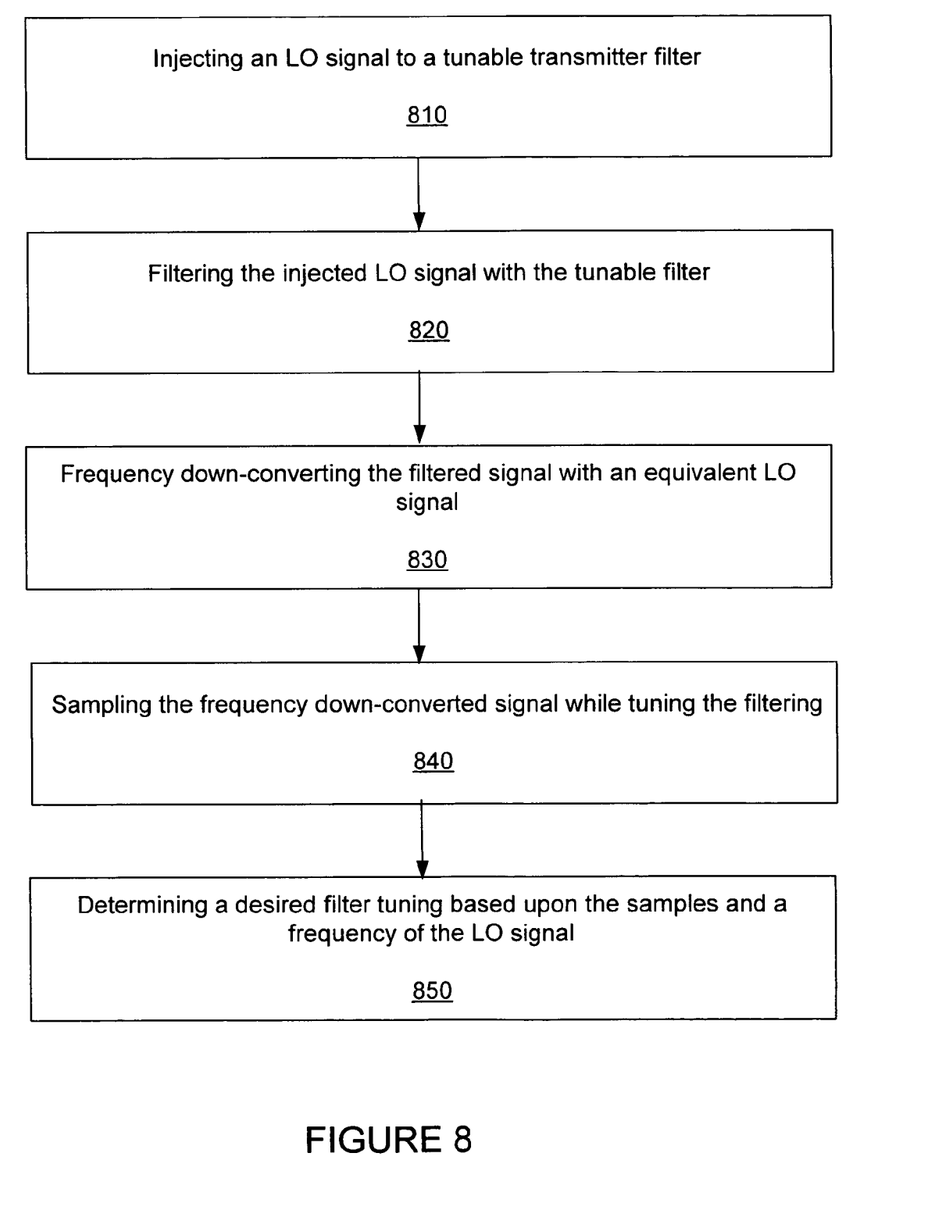
FIG. 8 is a flow chart depicting a method of calibrating filtering of a transmit signal.

FIG. 8 is a flow chart depicting a method of calibrating filtering of a transmit signal. A first step 810 includes injecting an LO signal to a tunable transmitter filter. A second step 820 includes filtering the LO signal with the tunable filter. A third step 830 includes frequency down-converting the filtered signal with an equivalent LO signal. A fourth step 840 includes sampling the frequency down-converted signal while tuning the filter. A fifth step 850 includes determining a desired first filter tuning based upon the samples and a frequency of the LO signal.

The method of calibrating filtering of the receive signal and the method of calibrating the transmit signal can be included within a transceiver. The methods can be included within multiple antenna transceivers that additionally include I-Q up converter and down converter chains. The transmitter and receiver chains can include multiple tunable filters that can be characterized to provide at least one of multiple possible filtering characteristics.

Although specific embodiments of the invention have been described and illustrated, the invention is not to be limited to the specific forms or arrangements of parts so described and illustrated. The invention is limited only by the appended claims.

What is claimed:

1. A method of calibrating filtering of a received signal comprising:
   injecting an LO signal;
   filtering the injected LO signal with a tunable filter;
   frequency down-converting the filtered signal with an equivalent LO signal;
   sampling the frequency down-converted signal while tuning the filtering;
   adjusting the injected LO signal and the equivalent LO signal to multiple frequencies; and
   determining a desired filter tuning based upon the samples for each of the multiple frequencies;
   storing the desired filter tuning corresponding with each of the LO frequencies;
   retrieving corresponding desired filter tuning when frequency down-converting received signals within receiver bands that correspond with one of the multiple LO frequencies.

2. The method of calibrating filtering of a received signal of claim 1, wherein each of the multiple frequencies correspond to a center frequency of one of multiple transmission channels.

3. The method of calibrating filtering of a received signal of claim 2, wherein the injected LO signal can be tuned off-center of each of the multiple transmission channels.

4. The method of calibrating filtering of a received signal of claim 1, wherein determining a desired filter tuning based upon the samples comprises tuning the filtering over channels corresponding to each of the multiple frequencies, and from the samples, determining the desired filter tuning to maximize in-band gain through the channels of each of the multiple frequencies.

5. The method of calibrating filtering of a received signal of claim 1, wherein determining a desired filter tuning based upon the samples comprises tuning the filtering over channels corresponding to each of the multiple frequencies, and from the samples, determining the desired filter tuning to maximize frequency response flatness through the channels of each of the multiple frequencies.

6. The method of calibrating filtering of a received signal of claim 1, wherein determining a desired filter tuning based upon the samples comprises tuning the filtering over channels corresponding to each of the multiple frequencies, and from the samples, determining the desired filter tuning to maximize out-of-band rejection of the channels of each of the multiple frequencies.

7. The method of calibrating filtering of a received signal of claim 1, wherein determining a desired filter tuning based upon the samples comprises tuning the filtering over channels corresponding to each of the multiple frequencies, and from the samples, determining the desired filter tuning to maximize a weighting of in-band gain through the channels of each of the multiple frequencies, frequency response flatness through the channels of each of the multiple frequencies, out-of-band rejection of the channels of each of the multiple frequencies.

8. The method of calibrating filtering of a received signal of claim 1, wherein determining a desired filter tuning based upon the samples comprises executing a binary search that converges on a maximum in-band gain.

9. The method of calibrating filtering of a received signal of claim 1, wherein determining a desired filter tuning based upon the samples comprises executing a binary search that converges on a maximum weighting of gain through the channels of each of the multiple frequencies, of frequency response flatness through the channels of each of the multiple frequencies, of out-of-band rejection of the channels of each of the multiple frequencies.

10. The method of calibrating filtering of a received signal of claim 1, wherein the injected LO signal and the equivalent LO signal, are the same LO signal.

11. The method of calibrating filtering of a received signal of claim 1, wherein the injected LO is coupled from a transmitter chain LO signal.

12. The method of calibrating filtering of a received signal of claim 1, wherein the tunable filter is at least one of a bandpass filter, a bandstop filter, lowpass filter, or a highpass filter.

13. A method of calibrating filtering of a transmit signal comprising:
    injecting an LO signal to a transmitter;
    filtering the LO signal with a first tunable filter;
    frequency down-converting the filtered signal with an equivalent LO signal;
    sampling the frequency down-converted signal while tuning the filter;
    adjusting the injected LO and the equivalent LO signal to multiple frequencies; and
    determining a desired first filter tuning based upon the samples for each of the multiple frequencies; wherein
    each of the multiple frequencies correspond to a center frequency of one of multiple transmission channels.

14. The method of calibrating filtering of a transmit signal of claim 13, wherein determining a desired first filter tuning based upon the samples comprises tuning the filtering over channels corresponding to each of the multiple frequencies, and from the samples, determining the desired filter tuning to maximize in-band gain through the channels of each of the multiple frequencies.

15. The method of calibrating filtering of a received signal of claim 13, wherein determining a desired first filter tuning based upon the samples comprises tuning the filtering over channels corresponding to each of the multiple frequencies, and from the samples, determining the desired filter tuning to maximize frequency response flatness through the channels of each of the multiple frequencies.

16. The method of calibrating filtering of a received signal of claim 13, wherein determining a desired first filter tuning based upon the samples comprises tuning the filtering over channels corresponding to each of the multiple frequencies, and from the samples, determining the desired filter tuning to maximize rejection of selected frequencies of the channels of each of the multiple frequencies.

17. The method of calibrating filtering of a received signal of claim 13, wherein determining a desired first filter tuning based upon the samples comprises tuning the filtering over channels corresponding to each of the multiple frequencies, and from the samples, determining the desired filter tuning to maximize a weighting of in-band gain through the channels of each of the multiple frequencies, of frequency response flatness through the channels of each of the multiple frequencies, of rejection of selected frequencies of the channels of each of the multiple frequencies.

18. The method of calibrating filtering of a received signal of claim 13, wherein determining a desired first filter tuning based upon the samples comprises executing a binary search that converges on a maximum in-band gain.

19. The method of calibrating filtering of a received signal of claim 13, wherein determining a desired first filter tuning based upon the samples comprises executing a binary search that converges on a maximum weighting of gain through the channels of each of the multiple frequencies, of frequency response flatness through the channels of each of the multiple frequencies, of out-of-band rejection of the channels of each of the multiple frequencies.

20. The method of calibrating filtering of a transmit signal of claim 13, further comprising:
  additionally filtering the LO signal with a second tunable filter;
  frequency down-converting the additionally filtered signal with an equivalent LO signal;
  sampling the frequency down-converted signal while tuning the second filter;
  determining a desired second filter tuning based upon the samples and a frequency of the LO signal.

21. The method of calibrating filtering of a transmit signal of claim 20, further comprising:
  adjusting the injected LO and the equivalent LO signal to multiple frequencies; and
  determining a desired second filter tuning based upon the samples for each of the multiple frequencies.

22. The method of calibrating filtering of a transmit signal of claim 21, further comprising a power detector coupled to an output of at least one of the first tunable filter and the second tunable filter, and corresponding samples are generated by sampling an output of the power detector.

23. The method of calibrating filtering of a transmit signal of claim 21, further comprising the second tunable filter filtering the LO signal after the first tunable filter filters the LO signal.

24. The method of calibrating filtering of a received signal of claim 21, wherein determining a desired first filter and second filter tuning based upon the samples comprises tuning the filtering over channels corresponding to each of the multiple frequencies, and from the samples, determining the desired first filter and second filter tuning to maximize a weighting of in-band gain through the channels of each of the multiple frequencies, of frequency response flatness through the channels of each of the multiple frequencies, of rejection of selected frequencies of the channels of each of the multiple frequencies.

25. The method of calibrating filtering of a received signal of claim 21, wherein determining a desired first filter and second filter tuning based upon the samples comprises executing a binary search that converges on a maximum in-band gain of the combined first and second filtering.

26. The method of calibrating filtering of a received signal of claim 21, wherein determining a desired first filter and second filter tuning based upon the samples comprises executing a binary search that converges on a maximum weighting of gain through the channels of each of the multiple frequencies, of frequency response flatness through the channels of each of the multiple frequencies, of out-of-band rejection of the channels of each of the multiple frequencies.

27. A transceiver comprising:
  a transmitter comprising;
    a first tunable filter;
    a second tunable filter
    means for coupling an LO signal through the first tunable filter and the second tunable filter;
    means for tuning the first and second tunable filters for multiple LO signal frequencies;
    frequency down-converting the first and second filtered LO signal;
    sampling the frequency down-converted first and second filtered LO signal while tuning the first and second tunable filters;
    determining desired first and second filter tuning based upon the samples and a frequency of the LO signal;
  the transceiver further comprising;
  a receiver comprising;
    a third tunable filter;
    means for coupling the LO signal through the third tunable filter;
    means for tuning the third tunable filter for multiple LO signal frequencies;
    frequency down-converting the third filtered LO signal;
    sampling the frequency down-converted third filtered LO signal while tuning the third tunable filter;
    determining desired third tunable filter tuning based upon the samples and a frequency of the LO signal.

* * * * *